April 9, 1946.  J. K. RUSSELL  2,398,041

FITTING

Filed May 4, 1943

INVENTOR
JOHN K. RUSSELL
BY
HARRIS, KIECH, FOSTER & HARRIS

Ward D. Foster

ATTORNEYS

Patented Apr. 9, 1946

2,398,041

UNITED STATES PATENT OFFICE 2,398,041

FITTING

John K. Russell, Los Angeles, Calif., assignor to Luber-Finer, Inc., Los Angeles, Calif., a corporation of California Application May 4, 1943, Serial No. 485,584

7 Claims. (Cl. 285—49)

My invention relates to a fitting for making a threaded connection to a pipe or receptacle and finds particular utility in making a threaded connection to a crank case of an internal combustion engine for connection to a lubricating system. Such application and the advantages thereof will be described to illustrate my invention, it being understood that the invention is not restricted to such use.

While the crank cases of internal combustion engines may be easily provided with unthreaded apertures, the provision of a threaded connection therein involves difficulties, because such crank cases are not accessible, except from the exterior thereof, without the expenditure of much time and effort. It is an object of my invention to provide a fitting which may be quickly and easily installed in such an aperture in a crank case from the exterior thereof, so that it is clamped firmly and in sealed relationship with the crank case, and which provides connecting means by which a liquid line may be readily secured thereto for communication with the crank case and readily removed therefrom.

Another object of my invention is to provide a fitting of the class described, providing the advantages hereinbefore stated when applied to a crank case wall, the surfaces of which are not plane but are somewhat curved. Another object of my invention is to provide a fitting having the features described, which may be readily installed with conventional tools. Among the other objects of the invention is the provision of a fitting of the class described comprising few parts, which can be formed in a simple and inexpensive manner.

Other advantages of the invention will be evident from the following specification, which may be better understood by reference to the accompanying drawing, in which Fig. 1 is a plan view of one embodiment of my invention;

Figure 1:
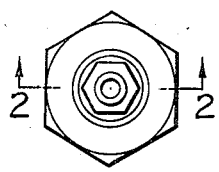

Referring to the drawing, which is for illustrative purposes only, the numeral 11 indicates the wall of a crank case or other receptacle, the interior of which is either impossible or inconvenient of access. The wall 11 has an outer surface 12 and an inner surface 13, and an unthreaded aperture 14 is formed therein. My invention is applicable to apertures of various outlines, the aperture 14 being illustrated as circular in outline for illustrative purposes.

The numeral 15 indicates generally the fitting of my invention, which includes a deformable sleeve member 16, a nut 17, and a plug 18. The sleeve member 16 includes an outer flange 19 of larger dimensions than the aperture 14 and a cylindrical portion 20 of external diameter slightly less than the diameter of the aperture 14 and projecting through the aperture 14 beyond the inner surface 13 of the wall 11. The sleeve member 16 is provided with a cylindrical bore 21 extending therethrough.

The plug 18 includes an outer portion 22 having a non-circular cross-sectional outline, illustrated in the drawing as hexagonal, an intermediate exteriorly threaded portion 23, a cylindrical portion 24, and an enlarged inner portion 25 separated from the cylindrical portion by an annular shoulder 26 of such dimensions that the sleeve member 16 may be positioned on the plug 18 with its cylindrical portion 20 around the cylindrical portion 24 and abutting against the shoulder 26. The plug 18 is provided with a cylindrical bore 27 and interior threads 28 adjacent its outer end.

The nut 17 is of non-circular cross-sectional outline, illustrated in the drawing as hexagonal, and is provided with interior threads 29 adjacent its outer end and an enlarged bore 30 adjacent its inner end.

Figure 2:
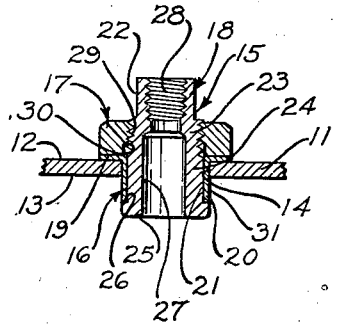
Fig. 2 is a vertical sectional view taken as indicated by the line 2—2 of Fig. 1.

In installing this form of the fitting of my invention, in the aperture 14 the sleeve member 16 may be positioned upon the plug 18, and the nut 17 may be threaded onto the plug 18 until it engages the flange 19, and the sleeve member 16 abuts against the shoulder 26, whereupon the assembled fitting 15 may be projected into the aperture 14 from the outer surface 12 of the wall 11, so that it occupies the position illustrated in Fig. 2. The sleeve member 16 being held against rotation with the flange 19 in contact with the outer surface 12 of the wall 11 by the use of any suitable tool, the nut 17 is then rotated, subjecting to longitudinal compression the portion of the sleeve member 16, indicated by the numeral 31, between the inner surface 13 and the shoulder 26. The nut 17 is threaded onto the plug 18 until this intermediate portion 31 is buckled into an annular radially extending rib 32 engaging the inner surface 13 of the wall 11.

It will be apparent that the nut 17 can be rotated relative to the plug 18 until the rib 32 is extended radially to the desired degree to firmly clamp the wall 11 between the rib 32 and the flange 19 of the sleeve member 16. The sleeve member 16 is thus secured and sealed to the wall 11. The nut 17 being in pressural contact with the flange 19 of the sleeve member 16, the fitting 15 is thus securely clamped and sealed to the wall 11 with the portion 31 of the sleeve member 16 subjected to longitudinal compression stress.

It will be noted that the axial depth of the enlarged bore 30 of the nut 17 is equal to or greater than the axial distance that the nut 17 is threaded upon the plug 18 during the installation of the fitting 15 for the reception of the cylindrical portion 24 of the plug 18. While the shoulder 26 and the abutting end of the sleeve member 16 are illustrated as being in a plane radial of the fitting 15, they may be sloped radially inwardly and axially outwardly if desired.

The fitting being thus installed, a lower threaded portion 33 of a union 34 is threaded into the upper end of the plug 18, and an upper threaded portion 35 of the union 34 is threaded into a union nut 36, thus connecting to the bore 27 an oil line 37 secured to the union nut 34 in the conventional manner.

Figure 4:
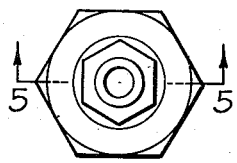
Fig. 4 is a plan view of another embodiment of my invention.
Figure 5:
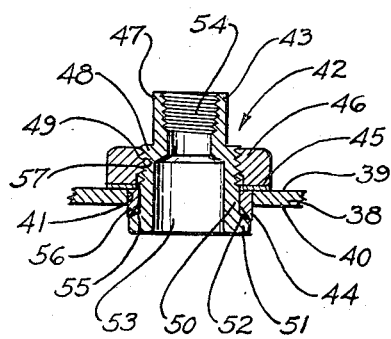
Fig. 5 is a vertical elevational view taken as indicated by the line 5—5 of Fig. 4.
Figure 6:
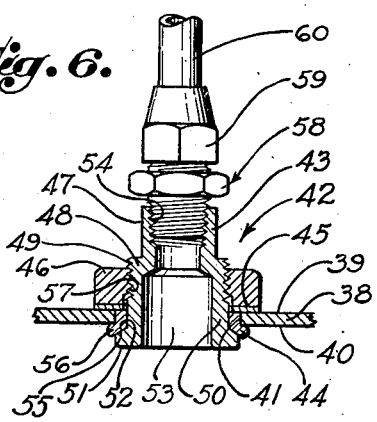
Fig. 6 is an elevational view partially sectioned of the embodiment illustrated in Figs. 4 and 5 after its installation and with an oil line connected thereto.

In the other embodiment of my invention, illustrated in Figs. 4 to 6, inclusive, the numeral 38 indicates a wall of a receptacle, such as the wall 11 previously described, and has an outer surface 39 and an inner surface 40. An aperture 41, illustrated as circular in outline, is cut in the wall 38. The fitting indicated generally by the numeral 42 includes a connecting member 43, a sleeve 44, a washer 45, and a nut 46. The connecting member 43 comprises an outer portion 47, an intermediate portion 48 having exterior threads 49, a cylindrical portion 50, and an enlarged portion 51 at its inner end separated from the cylindrical portion by an annular shoulder 52. The shoulder 52 is tapered radially inwardly and axially outwardly of the connecting member 43. The connecting member 43 is provided with a central cylindrical bore 53, the upper end of which is provided with threads 54.

The sleeve 44 is of an internal diameter to permit it to slide over the outer portion 47 and the intermediate portion 48 of the connecting member 43 until its lower end 55 rests upon the shoulder 52. As best illustrated in Fig. 5, the end 55 of the sleeve 44 is preferably tapered radially inwardly and axially outwardly of the sleeve at an angle different from the taper of shoulder 52, so that only the outer and lower portion of the end 55 engages the shoulder 52 when the sleeve 44 is free of longitudinal compression. The sleeve 44 is made of an external diameter to permit it to slide into the aperture 41 and of a length such that an inner end portion 56 extends inwardly of the inner surface 40 when its outer end is substantially flush with the outer surface 39 of the wall 38.

The nut 46 is of an external diameter greater than the diameter of the aperture 41 and is provided with internal threads 57 for engagement with the threads 49 on the connecting member 43. The fitting being installed within the aperture 41, as illustrated in Fig. 5, the connecting member 43 is held against rotation as by the engagement of a suitable tool with the outer portion 47 thereof, and the nut 46 is rotated by a suitable tool in engagement with the outer surface 39 of the wall 38.

Such rotation of the nut 46 subjects the sleeve 44 to longitudinal compression, causing its inner end portion 56 to flare outwardly into contact with the inner surface 40 of the wall 38. This outward flare is facilitated by the taper of the end 55 of the sleeve 44 and the shoulder 52. The rotation of the nut 46 relative to the connecting member 43 is continued until the end portion 56 is flared outwardly to position engaging the inner surface 40 of the wall 38 to the desired extent, as illustrated in Fig. 6.

At such time the inner surface 40 of the wall 38 is firmly engaged in sealing relationship by the outer end portion 56 of the sleeve 44, and the outer surface 39 of the wall 38 is firmly engaged in sealing relationship by the washer 45 compressed thereagainst by the nut 46. The connecting member 43 being in pressural contact with the end portion 56 of the sleeve 44 and threaded engagement with the nut 46, the fitting 43 is thus securely clamped in sealing relationship with the wall 38. As described in connection with the embodiment illustrated in Figs. 1 to 3, inclusive, a union 58, union nut 59, and oil line 60 may then be secured to the connecting member 43.

Figure 3:
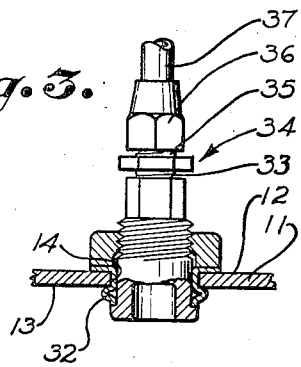
Fig. 3 is a vertical elevational view partially sectioned of the fitting illustrated in Figs. 1 and 2 after its installation and with an oil line secured thereto.

To facilitate the rotation of the nut 17 relative to the plug 18 in the form illustrated in Figs. 1 to 3, inclusive, and the rotation of the nut 46 relative to the connecting member 43 in the form illustrated in Figs. 3 to 6, inclusive, the cross-sectional outline of the outer portion 22 of the plug 18, the nut 17, the outer portion 47 of the connecting member 43, and the nut 46 are preferably made non-circular for the accommodation of a suitable tool. As illustrated in the drawing, such elements and such portions are made hexagonal in cross-sectional outline, though any non-circular outline adapted for the tools desired may be employed. Likewise, the plug 18 or the connecting member 43 may be provided with a recess or channels or indentations in its outer end for the reception of any suitable device to restrain it against rotation.

The elements of the fittings 15 and 42 are preferably formed of metal, so that their installation in the walls 11 and 38, respectively, are made as permanent as desired, though other materials, such as plastics, having suitable properties may be employed. The sleeve member 16 and the sleeve 44 are made of metal, such as aluminum, or an alloy or a plastic or other suitable material having the desired property of deformability upon the application of longitudinal compressive stress and are of such dimensions as to be deformed to the desired extent upon the application of such stress of predetermined value to contact in sealing relationship with a wall surface even though such surface is not perfectly plane and smooth.

When it is desired to employ the fitting as a closure or rivet, the opening through and threads within the plug 18 or the connecting member 43 may be omitted and such elements may be provided with a head of outwardly convex or other suitable form.

While the embodiments of the invention hereinbefore illustrated and described clearly perform the objects and provide the advantages primarily stated, my invention is to be understood as not restricted to these illustrative embodiments, but as including all modifications thereof coming within the scope of the claims which follow.

I claim as my invention:

1. In a fitting for a wall having an aperture therein, the combination of: a deformable sleeve member adapted for projection through the aperture and provided with a flange for engagement with the outer surface of the wall; a deformation resisting plug within said member and having a deformation resisting retaining shoulder engaging the inner end of said member, said plug having an outer portion non-circular in cross-sectional outline; and a deformation resisting nut non-circular in cross-sectional outline adapted for threading on said plug against said flange, whereby said member is buckled intermediate its ends into locking relationship with the wall by longitudinal compression of said member.

2. In a fitting for a wall having an aperture therein, the combination of: a sleeve member adapted for projection through the aperture; a plug within said member and engaging and retaining the inner end thereof; and a nut adapted for threading on the outer end of said plug against the wall and said member, whereby said member is buckled intermediate its ends into locking relationship with one side of the wall by longitudinal compression of said member to form an annular radially extending rib.

3. In combination: a wall having inner and outer faces and having an aperture therethrough; a deformable sleeve member projecting through said aperture and beyond said inner face; a plug within said sleeve member having laterally extending means abutting and retaining the inner end of said sleeve member, and having an outer threaded portion; and a nut threaded on said threaded portion and against the outer face of said wall and the outer end of said sleeve member, thereby forming an annular sealing rib in said sleeve member between its inner end and said inner face.

4. In combination: a wall having inner and outer faces, and an aperture therethrough; sleeve means adapted for projection through said aperture; a plug within said sleeve means engaging and retaining the inner end thereof; and means attached to the outer portion of said plug and in position against the outer face of said wall for compression of said sleeve means, said sleeve means being expanded at an intermediate point by said compression and forming two thicknesses of material, one of which overlies the other and engages the inner face of said wall.

5. In a fitting for a wall having an aperture: sleeve means adapted for projection through said aperture; a plug within said sleeve means engaging and retaining the inner end thereof; and means adapted for attachment to the outer portion of said plug and in position against the outer face of said wall for compression of said sleeve means, said sleeve means being expanded at an intermediate point by said compression into two annular thicknesses of material, one of which overlies the other and engages the inner face of said wall.

6. In a fitting for a wall having an aperture therethrough: deformable sleeve means adapted for projection through said aperture and having a length for formation of two annular thicknesses by deformation under compression; a plug adapted to be disposed within said sleeve means and having means engaging and retaining the inner end of said sleeve means; and means adapted for attachment to the outer portion of said plug for compression of said sleeve means whereby to expand said sleeve means at an intermediate point by said compression and form said two annular thicknesses of material, one of which thicknesses overlies the other and is bound against one face of said wall.

7. A fitting as in claim 6 wherein said engaging and retaining means on the inner end of said plug is in the form of a transversely disposed shoulder adapted for positive retention of the inner end of said sleeve means against relative movement between said inner end of said sleeve means and said shoulder when under compression.

JOHN K. RUSSELL.